US006910739B2

(12) United States Patent
Grable et al.

(10) Patent No.: US 6,910,739 B2
(45) Date of Patent: Jun. 28, 2005

(54) SEAT RECLINER MECHANISM INCORPORATING ROTATABLE SEATBACK SLAVED TO A FLOOR LATCH RELEASE

(75) Inventors: David Grable, Utica, MI (US); Keith Brantley, Clinton Township, MI (US)

(73) Assignee: BAE Industries, Inc., Centerline, MI (US)

( * ) Notice: Subject to any disclaimer, the term of this patent is extended or adjusted under 35 U.S.C. 154(b) by 0 days.

(21) Appl. No.: 10/649,120

(22) Filed: Aug. 27, 2003

(65) Prior Publication Data

US 2005/0046261 A1    Mar. 3, 2005

(51) Int. Cl.[7] .................................................. B60N 2/20
(52) U.S. Cl. ............................. 297/378.12; 297/378.1; 296/65.09
(58) Field of Search ........................ 297/378.12, 378.1, 297/378.11, 378.14; 296/65.09

(56) References Cited

U.S. PATENT DOCUMENTS

| 3,954,245 | A |   | 5/1976  | Costin ........................ 248/400 |
| 4,223,946 | A | * | 9/1980  | Kluting ....................... 297/363 |
| 4,372,610 | A | * | 2/1983  | Fisher et al. ................. 297/367 |
| 4,484,776 | A |   | 11/1984 | Gokimoto ................. 296/65 R |
| 4,484,779 | A | * | 11/1984 | Suzuki ........................ 297/326 |
| 4,634,182 | A | * | 1/1987  | Tanaka .................. 297/378.11 |
| 4,705,319 | A | * | 11/1987 | Bell ............................ 297/362 |
| 4,747,641 | A |   | 5/1988  | Bell ............................ 297/379 |
| 5,393,116 | A | * | 2/1995  | Bolsworth et al. ....... 296/65.03 |
| 5,527,087 | A |   | 6/1996  | Takeda ......................... 297/15 |
| 5,542,745 | A |   | 8/1996  | Takeda .................. 297/378.12 |
| 5,577,805 | A |   | 11/1996 | Glinter ................... 297/378.12 |
| 5,702,145 | A |   | 12/1997 | Fowler ......................... 296/66 |

(Continued)

FOREIGN PATENT DOCUMENTS

JP            59034942 A  *  2/1984  ............ B60N 1/10

Primary Examiner—Peter M. Cuomo
Assistant Examiner—Stephen D'Adamo
(74) Attorney, Agent, or Firm—Gifford, Krass, Groh, Sprinkle, Anderson & Citkowski, P.C.

(57) ABSTRACT

A recliner mechanism for use with a vehicle seat having bottom and a pivotally secured back. A release mechanism is operably engaged to the back and includes an actuating handle extending from the bottom. A plate is secured to the back at a first location and pivotable along with the back about an axis defined at a second location, an arcuate exterior surface defined by the plate exhibiting a recessed detent. A floor release lever is secured to the bottom proximate the plate and is pivotally associated with the release mechanism by a cable extending to a floor latch mechanism associated with the vehicle. A male detent is pivotally secured to the seat bottom in inter-disposed fashion between the floor release lever and the plate. Upon the release mechanism rotating the floor release lever, and the cable causing the seat bottom to disengage from the floor latch mechanism, the male detent is influenced by the release lever in a first direction to seat against the recessed detent location of the plate and to prevent a forwardly pivoted seat back from being rotated in a reverse direction. Upon the seat bottom further being rotated back into engagement with the floor latch mechanism, the male detent is influenced by the release lever in a second direction to permit the seat back to be pivoted in the reverse direction.

10 Claims, 10 Drawing Sheets

U.S. PATENT DOCUMENTS

| | | | |
|---|---|---|---|
| 6,139,104 A * | 10/2000 | Brewer | 297/353 |
| 6,209,955 B1 * | 4/2001 | Seibold | 297/216.13 |
| 6,290,297 B1 * | 9/2001 | Yu | 297/378.12 |
| 6,345,867 B1 | 2/2002 | Hellrung | 297/336 |
| 6,478,358 B1 | 11/2002 | Okazaki | 296/65.09 |
| 6,698,837 B2 * | 3/2004 | Pejathaya et al. | 297/378.12 |

* cited by examiner

SEAT RECLINER MECHANISM INCORPORATING ROTATABLE SEATBACK SLAVED TO A FLOOR LATCH RELEASE

BACKGROUND OF THE INVENTION

1. Field of the Invention

The present invention relates generally to pivoting seat back recliner mechanisms for use in vehicle applications. More specifically, the present invention discloses an improved seat recliner mechanism, incorporating a rotatable seat back, and which is slaved to a floor latch release to prevent the seat back from being rotated to a rearward/upward use position unless the floor latch release is engaged.

2. Description of the Prior Art

The prior art is well documented with examples of seat back recliner mechanisms. In a preferred application, the seat recliner design is intended to provide only selective activation and deactivation of the associated floor release mechanism.

An example of such a seat device for a vehicle is set forth in U.S. Pat. No. 6,478,358, issued to Okazaki et al., and which includes a seat slide mounted on a floor of the vehicle. A seat, including a seat cushion and a seat back, is releasably locked to the floor. A folding device operates to forwardly fold the seat back of the seat onto the seat cushion and from an upright sitting position to a forward folded position. A mechanism operates the releasable locking structure and an operation limit mechanism located between the folding device and the operation mechanism allows for lock release operation only when the seat back is in the folded position on the seat cushion and further prevents the lock release mechanism when the seat back is in the upright sitting position.

A further example of a seat recliner and floor latch with interlock is set forth in U.S. Pat. No. 6,345,867, issued to Hellrung et al. The assembly in Hellrung includes a seat bottom mounted to a base and a seat back adjustable relative to the seat bottom. A seat back latch mechanism interconnects the seat back and the seat bottom for movement of the seat back between a use position and a folded position. A floor-latch mechanism selectively connects the seat bottom to the base for movement of the seat bottom between a deployed position and a stowed position. An interlock mechanism interacts with the floor latch mechanism and the seat-back latch mechanism, wherein the interlock mechanism blocks operation of the floor latch mechanism when the seat back is in the use position and blocks operation of the seat-back latch mechanism when the seatback is in the stowed position.

SUMMARY OF THE PRESENT INVENTION

The present invention discloses an improved recliner mechanism exhibiting the ability to prevent a forwardly pivoted (dumped) vehicle seat back, and such as is typically associated with a second or third row vehicle seat, from being rotated in a return and upright direction until such time as an associated floor latch mechanism associated with the vehicle is re-engaged by a seat bottom. The present invention is further an improvement over the prior art in that it discloses an improved and simplified structure for slaving a forwardly pivoted seat back to a floor latch release mechanism engaged by an associated seat bottom.

A release mechanism is operably engaged to the seat back and including an actuating handle extending from the seat bottom. The bottom further includes an outer plate and an inner plate sandwiching therebetween the seat back and the release mechanism.

A plate is secured to the seat back at a first location and pivotable along with the seat back about an axis defined at a second location, an arcuate exterior surface defined by the plate further exhibits a recessed detent location. A floor release lever is secured to the seat bottom proximate the plate, the floor release lever being pivotally associated with the release mechanism and including a cable extending to a floor latch mechanism associated with the vehicle.

A male detent is pivotally secured to the seat bottom in inter-disposed fashion between the floor release lever and the plate, the floor release lever and male detent being positioned upon an outer facing surface of the inner plate. The release mechanism further including a secondary release lever pivotally associated with the handle, the floor release lever and secondary release lever each exhibiting an interengaging tab such that the secondary release lever influences the floor release lever in selective first and second directions.

Upon the release mechanism rotating the floor release lever and the cable to cause the seat bottom to disengage from the floor latch mechanism, the male detent is influenced by the release lever in a first direction to seat against the recessed detent location of said plate and to prevent a forwardly pivoted seat back from being rotated in a reverse direction. Upon the seat bottom subsequently being rotated back into engagement with the floor latch mechanism, the male detent is then influenced by the release lever in a second direction to permit the seat back to be pivoted in the reverse (upright) direction.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
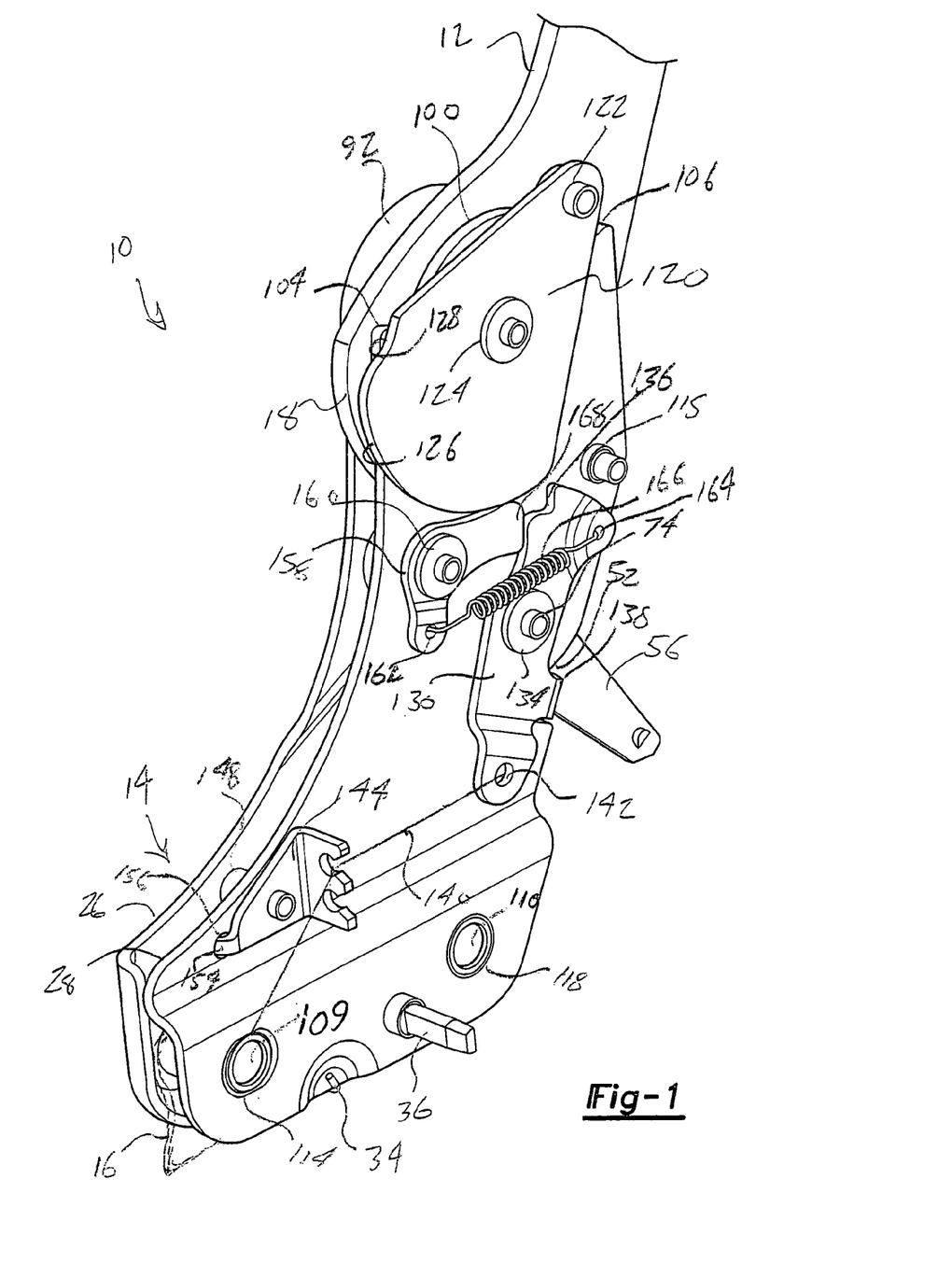
FIG. 1 is a perspective view of the seat recliner mechanism with pivotable seat back and slaved floor latch release according to the present invention.

Referring now to FIG. 1, a general illustration is given at 10 of a seat back recliner mechanism according to the present invention. In particular, the improved seat recliner mechanism incorporates a rotatable seat back, slaved to a floor latch release and in order to prevent the seat back from being rotated to a rearward/upward use position unless the floor latch release is engaged.

Referring again to FIG. 1, a perspective view is illustrated of the seat recliner mechanism 10 and which further includes a pivotable seat back 12 and seat bottom, see further as generally shown at 14, slaved to a floor latch release (see in phantom at 16) according to the present invention. As best further shown in the partial cutaway illustration of FIG. 2, the seat back 12 includes a lower arcuate extending surface 18, along an exterior facing portion of which are defined a first plurality of serrated teeth 20. As also further best illustrated in the exploded view of FIG. 3, the seat back 12 further includes first 22 and second 24 apertures formed therethrough.

Referring again to FIGS. 1–3, the seat bottom 14 includes an outer plate 26 and a spaced apart inner plate 28, these sandwiching therebetween the seat back 12 and a plurality of release mechanism components, as will be described. The plates 26 and 28 are of a generally planar shaped and arcuate configuration and a handle, not shown in FIGS. 1–3 but illustrated at 30 in FIG. 4, is secured in extending fashion from the seat bottom inner plate 28 and actuated to adjust the seat back 12.

Referring again to FIG. 3, a description will now be made of the components associated with seat back recliner mechanism. These include an elongated spline 32 rotatably secured in spring-loaded fashion, see further spline torsion spring 34, between the outer 26 and inner 28 plates, see further apertures 33 and 35 formed through the outer 26 and inner 28 plates, respectively. The spline 32 includes a first circumferential configuration, at a first end 36 projecting from the inner plate 28 and which mounts thereupon the handle 30 (again FIG. 4, et seq.), as well as a further circumferential configuration located at a second opposite end 38.

An arcuate shaped lever 40 is attached to the opposite extending end 38 of the rotatable spline, see arcuate aperture 42 at a lower end of the lever 40 and which matingly engages over a corresponding circumferential configuration associated with the second extending end 38 of the spline 32. The lever 40 terminates in a remote and arcuately extending end, within which is defined a slot aperture 44.

A secondary release lever 46 is pivotally associated with the handle 30, via an aperture 48 formed through a first end, a rivet 49 securing the lever end in actuating and channeled fashion within the slot aperture 44. The secondary release lever 46 further includes a tab 50, the same projecting from a recessed rear notch location 52 associated with the inner plate 28, as well as further including a modified slot shape aperture 54 formed through an intermediate and upper end location of the lever 46. The lever 46 also includes an extending end 56.

A recliner pawl 58 is pivotally mounted by a rivet 60, again FIG. 3, extending through an aperture 62 in the pawl 58, and in turn mounted through additional apertures 64 and 66 in the outer 26 and inner 28 plates. The pawl 58 includes a second plurality of serrated teeth 68 defined along an exterior surface thereof and which, upon being influenced against the seat back 12, interengages with the teeth 20 defined along the seat back lower arcuate edge.

The pawl 58 further is influenced by a pivotally associated and co-acting cam recliner 70, and such that the pawl is operatively engaged to said seat back 12 in a first position and disengaged from said seat back in a second position. The cam recliner 70 further includes a modified aperture 72, through which is received a cam pivot pin 74, the pivot pin 74 also mounting the secondary release lever 46 and securing through yet additional apertures 76 and 78 in the outer 26 and inner 28 plates, respectively.

Figure 2:
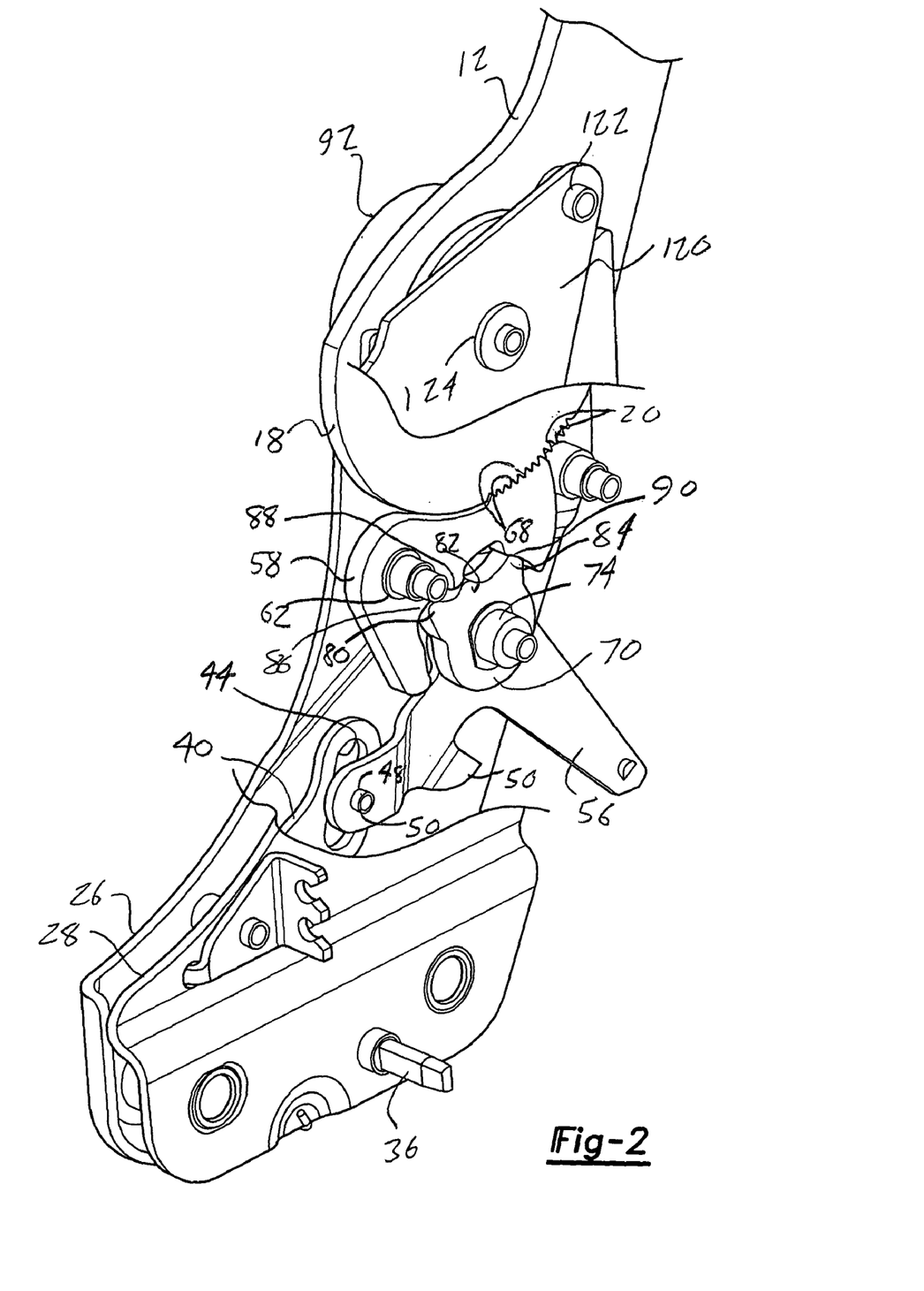
FIG. 2 is a succeeding perspective illustration, in which a portion of the inner plate is removed, and illustrating the interengagement of the recliner pawl, cam recliner and release lever according to the present invention.
Figure 3:
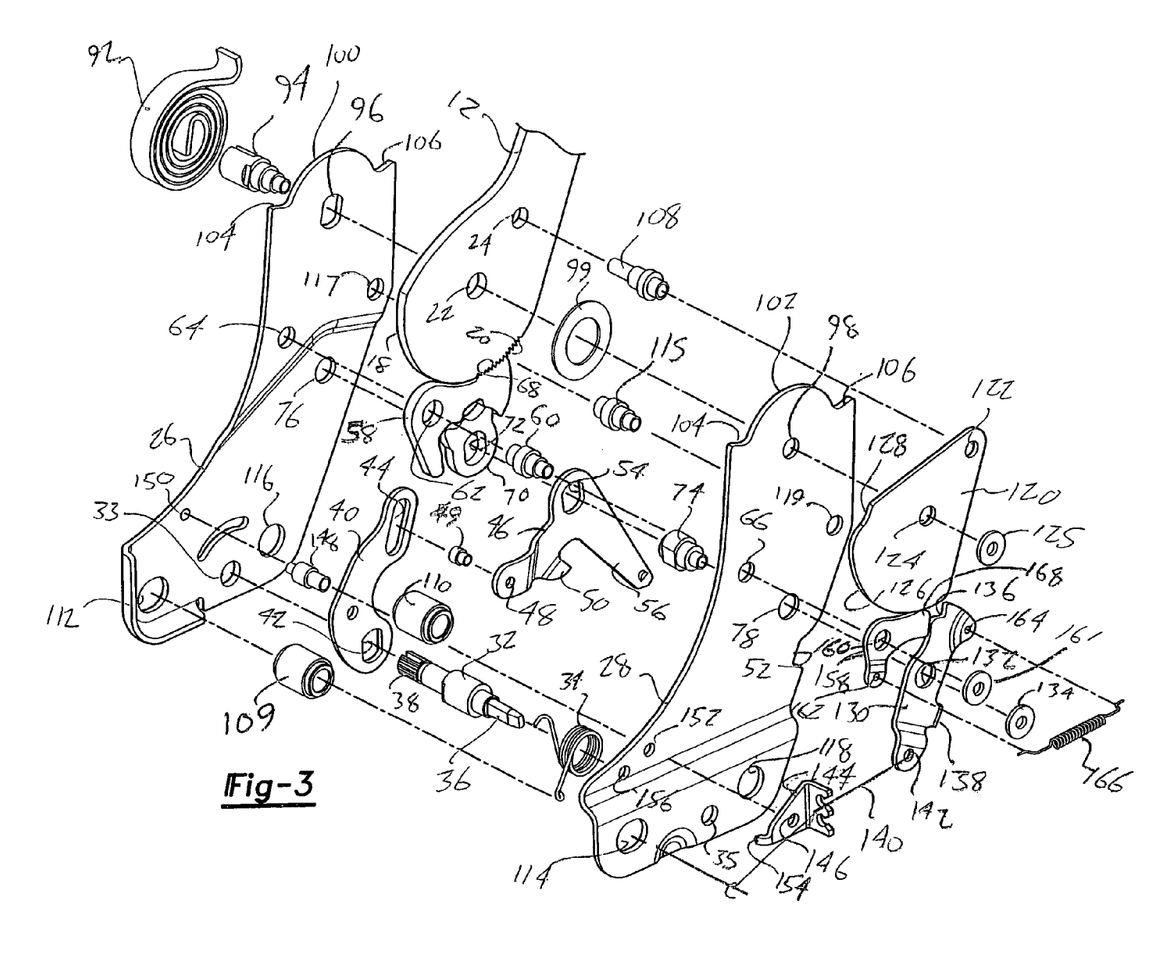
FIG. 3 is a partial exploded view illustrating the seatback pivoting mechanism arranged between the inner and outer plates, as well as the exteriorly positioned floor latch release mechanism according to the present invention.
Figure 4:
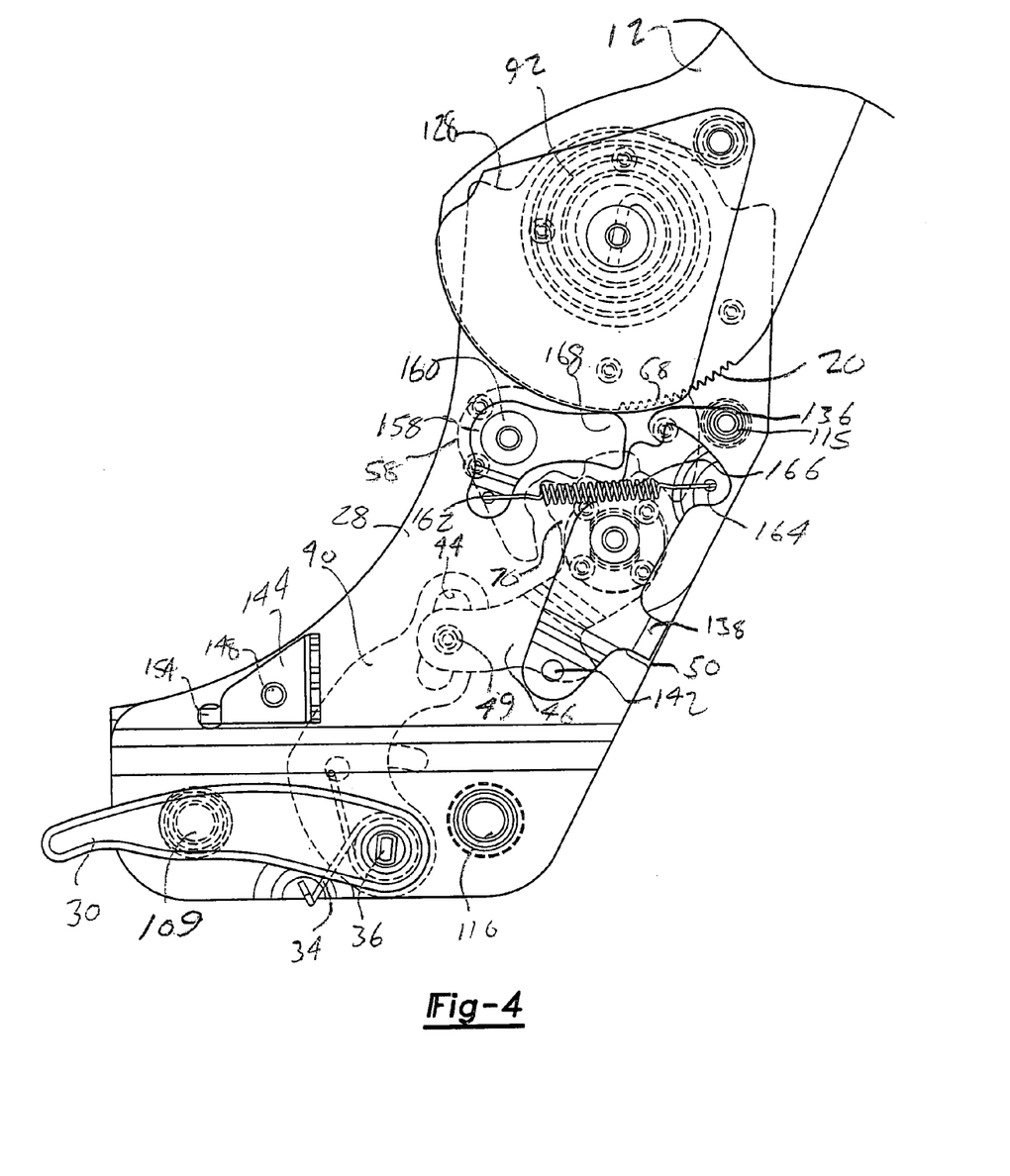
FIG. 4 is a side view, in partial phantom illustration, of the seat back recliner mechanism in an upright engaged position according to the present invention.

The cam recliner 70 additionally includes a configured exterior pattern, as shown in FIG. 3 and further illustrated in enlarged fashion at 80, 82 and 84 in FIG. 2, and which matingly engages a corresponding and opposing configuration, see at 86, 88 and 90 associated with the pawl 58, and in order to selectively engage and disengage the pawl 58 (and its teeth 68) relative to the exteriorly configured teeth 20 of the seat back 12, depending further upon the actuating position of the handle 30, via the motion of the interconnecting and associated spline lever 40, secondary release lever 46, cam recliner 70 and pawl 58.

Yet additional features associated with the recliner mechanism include a main pivot coil spring 92, secured to an exteriorly facing surface of the outer plate 26 and biasingly influencing the seat back 12 in a forward, counterclockwise direction, via a main pivot pin 94 extending through apertures 96 and 98 in the outer 26 and inner plates 28, as well as the aperture 22 of the seat back 12 and washer 99, positioned in alignment with the apertures 96 and 98. As will be further described, the outer plate 26 includes a top arcuate surface 100 and the inner plate 28 includes a likewise top arcuate surface 102, each of the arcuate surfaces exhibiting forward 104 and rearward 106 stop positions which define therebetween a travel path for an elongated rivet arm 108 seated through spaced apart aperture 24 in the seat back 12.

Recliner bushings 109 and 110 seat through additional pairs of apertures 112 & 114 and 116 & 118, defined again through the outer 26 and inner 28 plates and in order to secure the seat back recliner mechanism at a lower end, and an additional rivet 115 extends through apertures 117 and 119 in the outer 26 and inner 28 plates, respectively, to secure together the upper end of the assembly.

Referring again initially to FIGS. 1–3, a description will now be given of the components providing the floor latch release mechanism according to the present invention. Specifically, a plate 120 is secured to the seat back 12, via an aperture 122 extending through a first location of the plate 120 and which receives an extending end of the rivet arm 108. A second aperture 124 in the plate 120 is aligned with the main pivot axis of the seat back 12 (see co-linear apertures 96, 22, and 98) and, upon receiving an end of the main pivot 94 extending through the inner plate 28 and also seating a washer 125, causes the plate 120 to be pivotable along with the seat back 12 about the main pivot point. An arcuate extending exterior surface 126 is provided along a lower most extending edge of the plate 120 and which terminates in a forward positioned and recessed detent location 128.

A floor release lever 130 is secured to the seat bottom 12 at a location proximate the plate 120, and in particular is mounted to an extending end of cam pivot pin 74 which seats through an aperture 132 established a substantially midpoint of the elongated shaped lever 130 and associated washer 134. The floor release lever 130 exhibits a recessed configuration 136 proximate a first (generally upper) end, as well as an inwardly projecting tab 138 at a second (generally lower) end. The tab 138 interengages the tab 50 corresponding to the secondary release lever 46 and projecting across the recessed notch configuration 52.

The floor release lever 130 is further pivotally associated with the floor release mechanism (again generally at 16 in FIG. 1) by means of a cable 140 secured to a lowermost aperture 142 (again FIG. 3) in the release lever 130, channeled to a cable bracket 144, secured to the outer plate 28 and extending to the floor latch mechanism associated with the vehicle. The cable bracket 144 includes an aperture 146 which receives a cable bracket rivet 148 extending through aperture 150 (outer plate 26) and 152 (inner plate 28). An inwardly turned edge 154 of the bracket 144 is received through a further spaced aperture 156 formed through the inner plate 28 and in order to securely mount the cable bracket 144 in place.

A cam 158 is pivotally secured to the inner plate 28 of the seat bottom, see pin 60 associated with the release pawl 58 and which extends through aperture 66 in the inner plate 28 and through an aperture 160 (see also washer 161) in the cam 158. The cam 158 is thereby mounted in inter-disposed fashion between the floor release lever 130 and the plate 120. The cam 158 exhibits a generally "L" shaped configuration and including a hole 162 at a lower end and which, in combination with a hole 164 in an upper most end of the lever 130, seats the opposite extending ends of an extension spring 166 to cause the cam 158 to pivot in a counterclockwise fashion upon the release lever 130 being pivoted in a clockwise direction. The cam 158 further includes a configuration 168 at its opposite end and which is selectively received in engagement with either the configuration 136 of the release lever 130 or the detent 128 associated with the plate 120, depending upon the positioning of the recliner mechanism and as will be further described.

Referring now to FIGS. 4–10 in succession, an explanation will now be given of the operating characteristics of the recliner mechanism. Referring first to FIG. 4 the seat back recliner mechanism is illustrated in an upright engaged position and by which the upwardly facing teeth 68 of the recliner pawl 58 are influenced so as to be engaged against the teeth 20 of the seat back 12.

Figure 5:
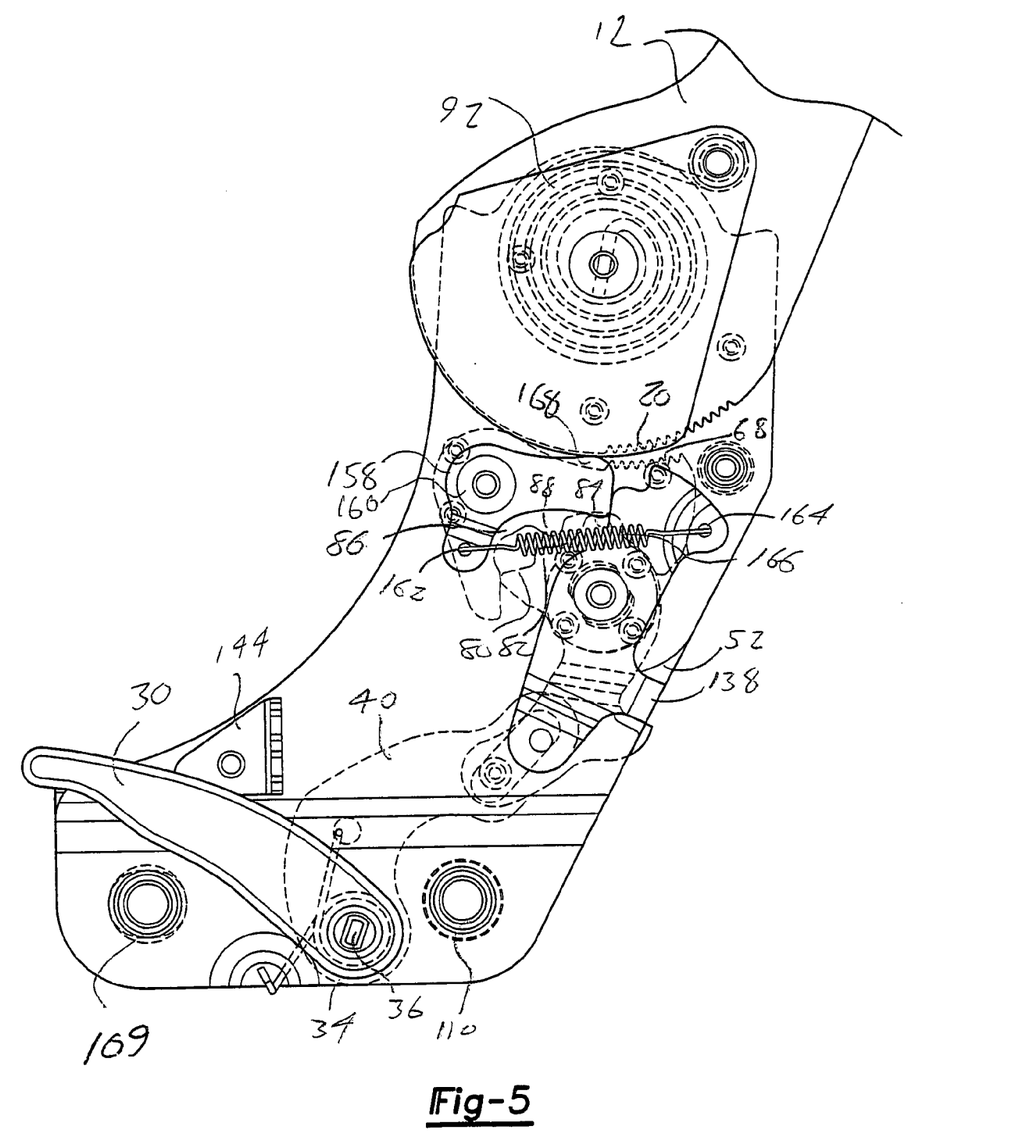
FIG. 5 is a succeeding side view, again in partial phantom, and showing the seat back recliner mechanism in an initial release position.

Referring to FIG. 5, the seat back recliner mechanism is repositioned to an initial release position, whereby the upward (clockwise) actuation of the handle 30 (in this instance an angular offset of 27.5° relative to a horizontal). This results from the clockwise rotation of the spline lever 40, in turn causing the secondary release lever 50 to rotate counterclockwise (along with the slaved cam recliner 70) and by which its configurations 80, 82 and 84 displace relative to those 86, 88 and 90 (see again FIG. 2) of the pawl 58 and in order that the upwardly facing teeth 68 of the pawl drop out of engagement relative to the teeth 20 of the seat back 12. In this position, the seat back 12 is influenced in a freely forward rotating fashion by virtue of the biasing action of the main spring 92.

Figure 6:
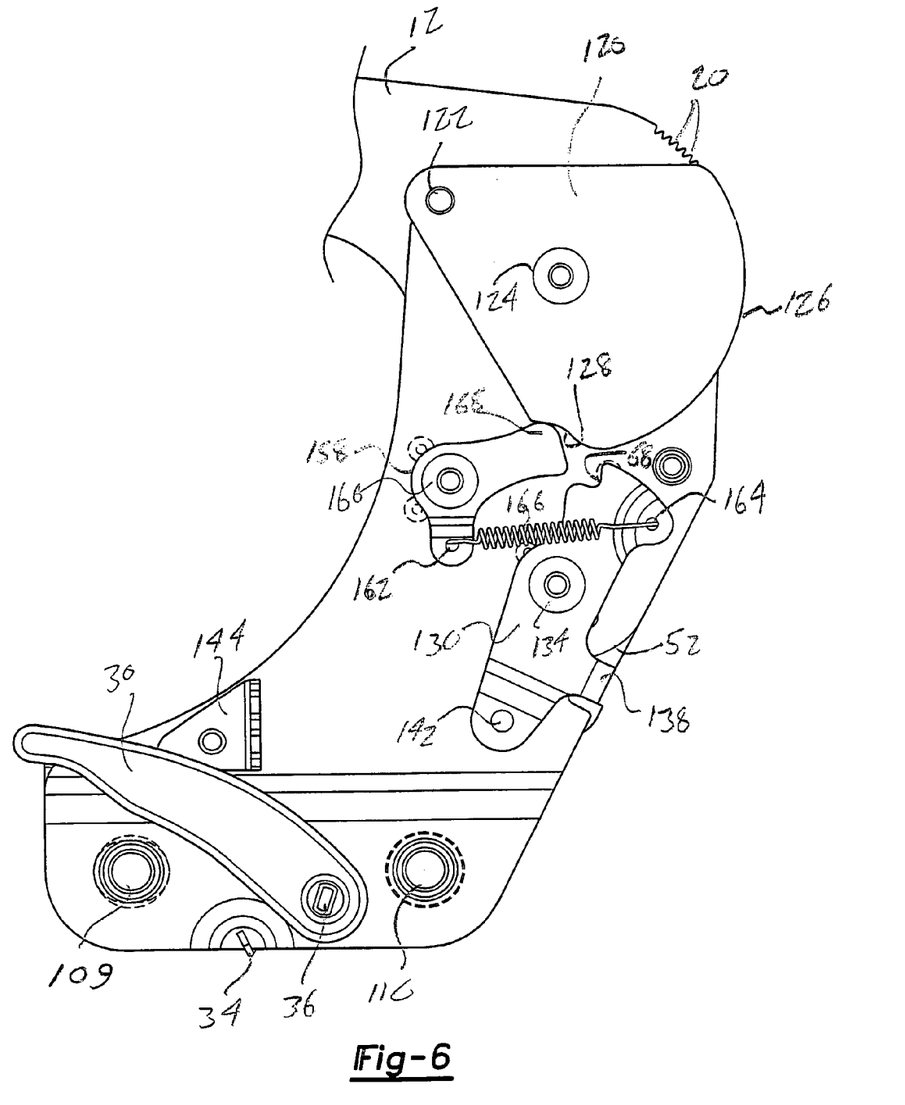
FIG. 6 is a further side view illustrating the seat back in a forwardly folding position.

Referring now to FIG. 6, a further side view is illustrated of the seat back in a forwardly folding position and by which the seat back 12 is rotated to a substantially forward-most position relative to the seat bottom 14. At this position, the interengagement of the tabs 50 (secondary release lever 46) and 138 (floor latch release lever 130), causes the lever 130 to pivot in a counterclockwise direction, thus translating the force of the stretched spring 166 to the cam 158, causing it in turn to also be rotated in a counterclockwise direction and so that its configuration 168 abuttingly seats against the detent location 128 in the seat back 12.

Figure 7:
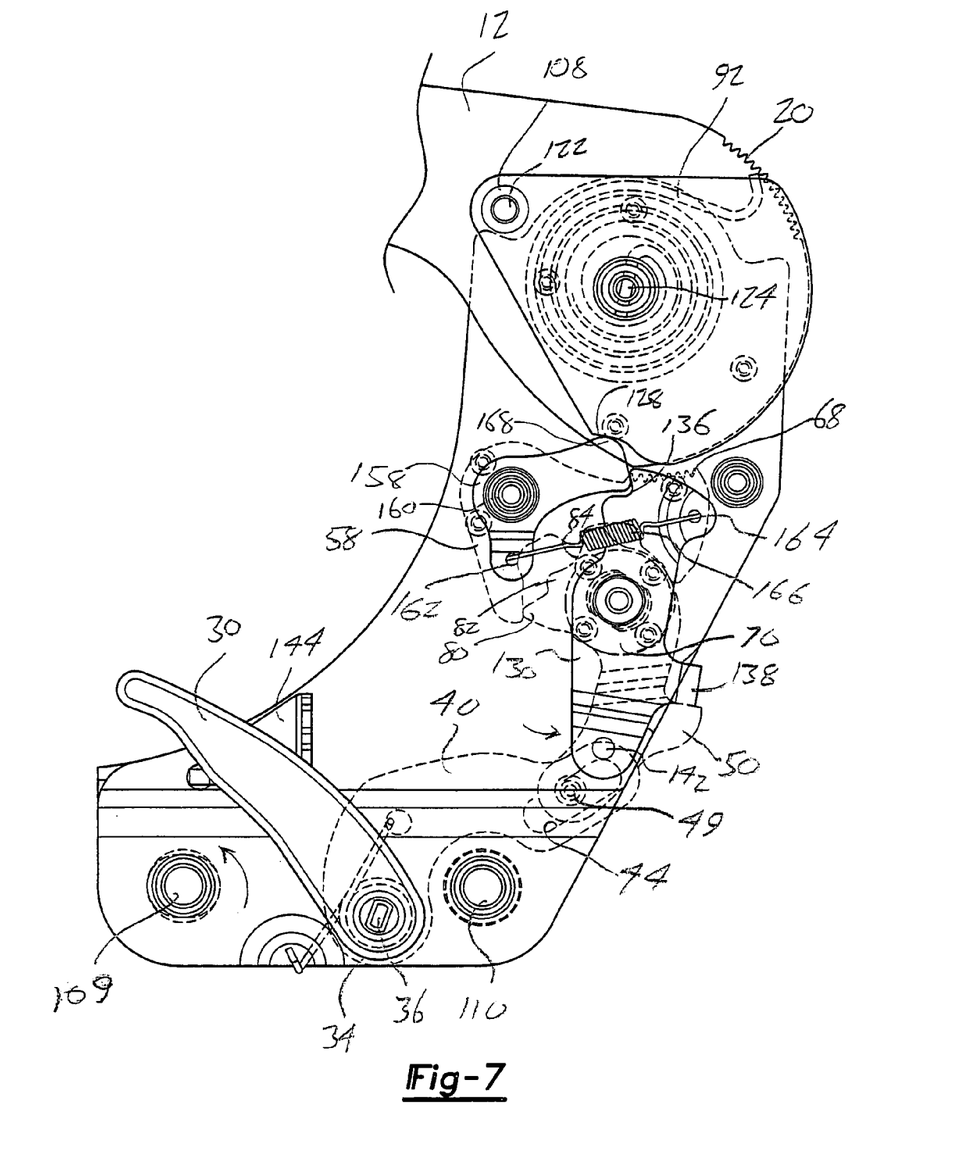
FIG. 7 is a forward flat folded configuration and by which the seat bottom is released from the floor latch and the seat back is capable of being rotated a completely and forwardly dumped position.

Referring now to FIG. 7, further upward (clockwise) actuation of the handle (in this instance illustrated at 41.5° relative to a horizontal axis), causes the seat bottom to be released from the floor latch 16 (see again FIG. 1) and so that the seat back 12 is capable of being rotated a completely and forwardly dumped position. In this position, the seat back 12 is itself in a most forwardly rotated position relative the seat bottom 14, and the additional upward actuation on the handle 30 causes the spline lever 40 to rotate in a furthest-most clockwise direction, whereby the secondary release lever 46 and rotatably slaved release lever 130 are caused to pivot to a maximum counterclockwise direction such that the force on the cable 140 (via cable bracket 142) causes the disengagement of the seat bottom 14 from the floor latch 16 and the configured end 168 of the cam 158 to be sandwiched between the recessed location 128 of the plate 120 and the edge configuration 136 of the release lever 130.

Figure 8:
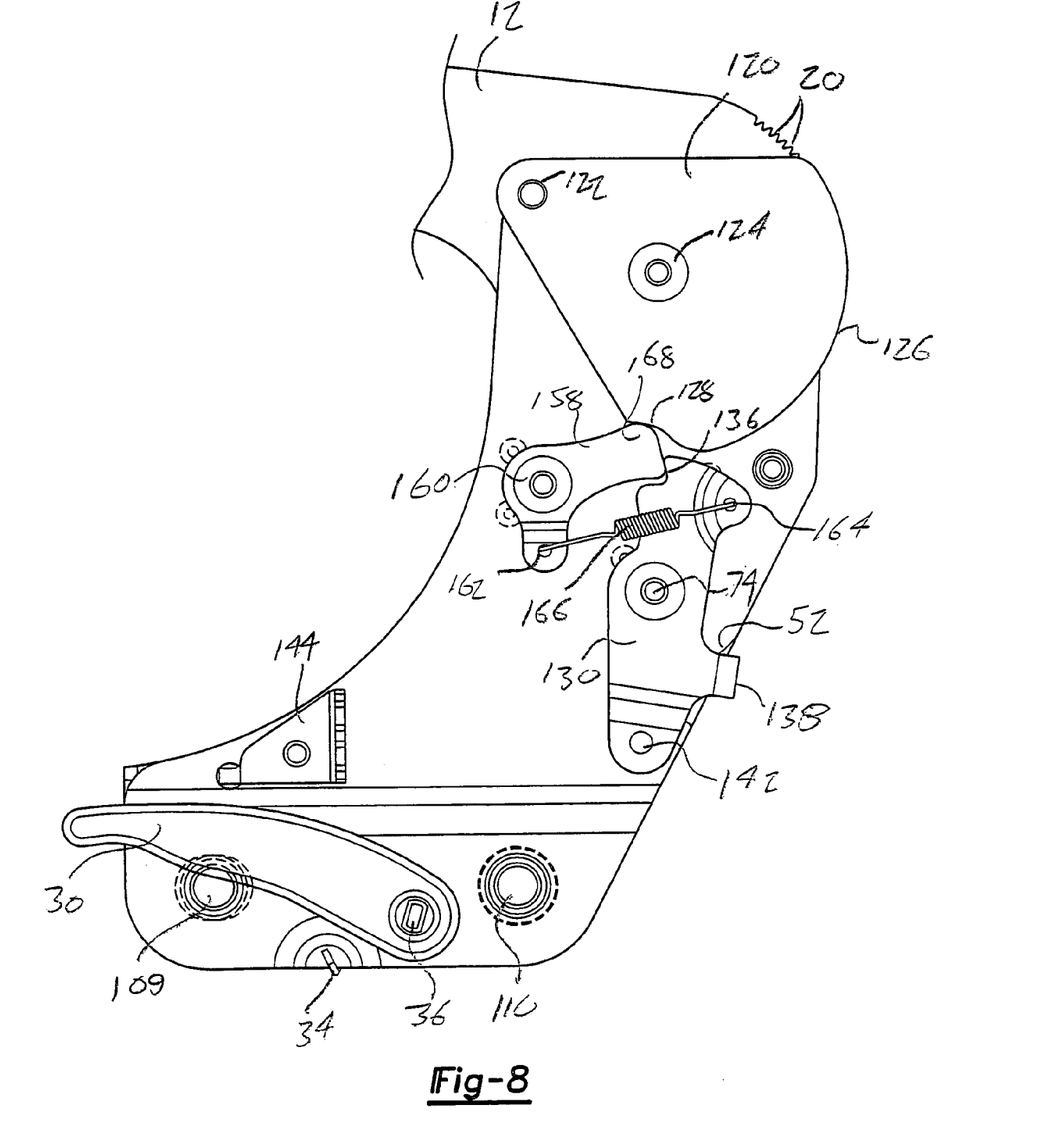
FIG. 8 is an illustration of a forward dumped position of the seat back and further by which the male detent plate precludes a return and rearward/upright rotation of the seat back consistent with the seat bottom remains disengaged from the floor release latch.

Referring now to FIG. 8, a succeeding illustration is shown of a forward dumped position of the seat back 12 and further by which the cam 158 (see again edge configuration 168) precludes a return and rearward/upright rotation of the seat back 12, consistent with the seat bottom 14 remaining disengaged from the floor release latch 16. This position is further achieved by virtue of the face that the cam 158 is positioned immovably between the configuration 136 of the release lever 130 and the recessed configuration 128 of the plate 120 and by which the maximum counterclockwise rotated position of the release lever 130 precludes the cable 140 from allowing the seat bottom 14 to re-engage the floor latch mechanism 16.

Figure 9:
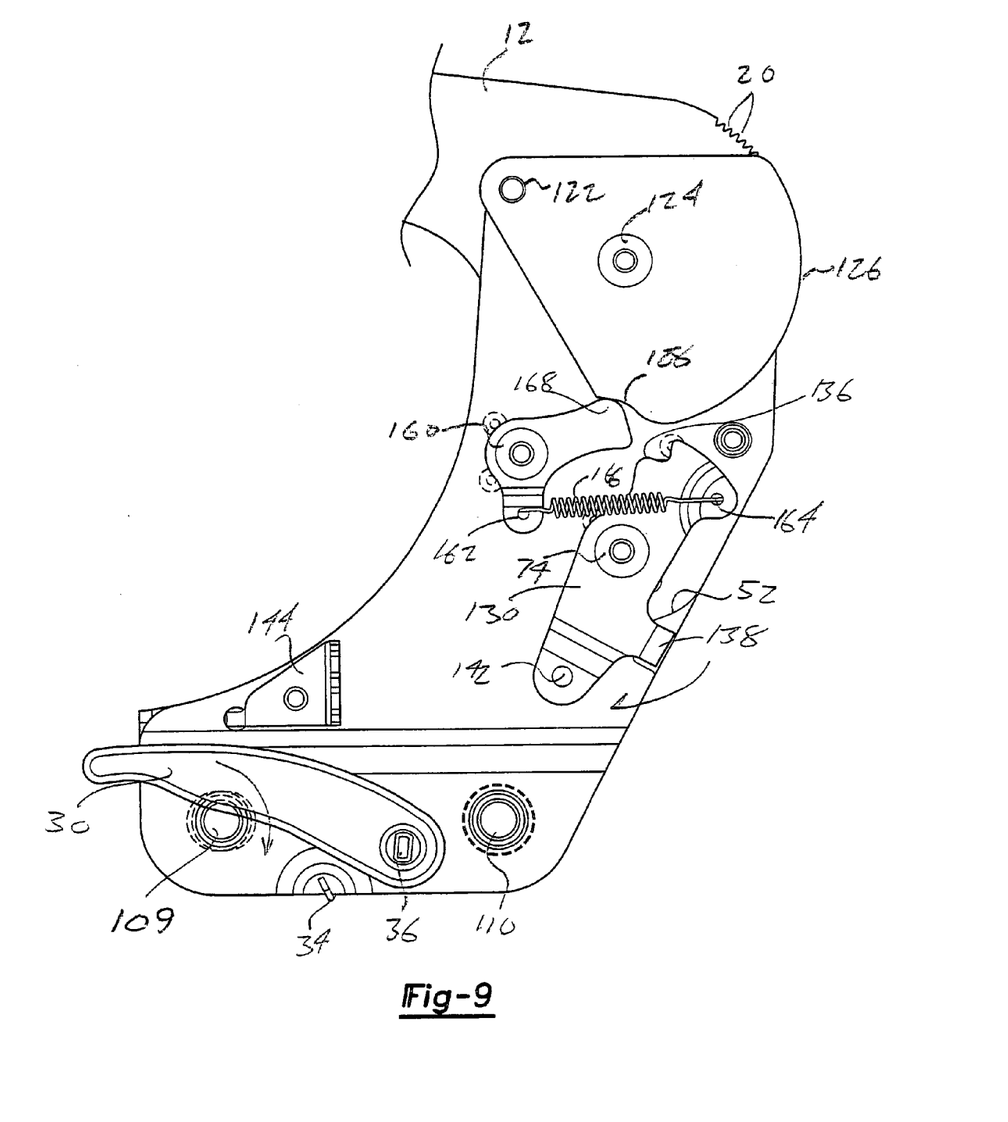
FIG. 9 is a further succeeding floor lock position and by which the seat bottom is in the process of being re-engaged with the floor latch.

Referring further to FIG. 9, a further succeeding floor lock position is now shown and by which the seat bottom 14 is in the process of being re-engaged with the floor latch 16. The positioning in FIG. 9 is caused by a return and downward actuation of the handle (see clockwise directed arrow), which in turn causes the associated spline lever 40 and secondary release lever 46 (both not shown) to in turn rotate the release lever 130 in a reverse and clockwise direction, whereby the tension on the cable 140 (again FIG. 1) is relaxed and the floor latch 16 re-engaged.

Figure 10:
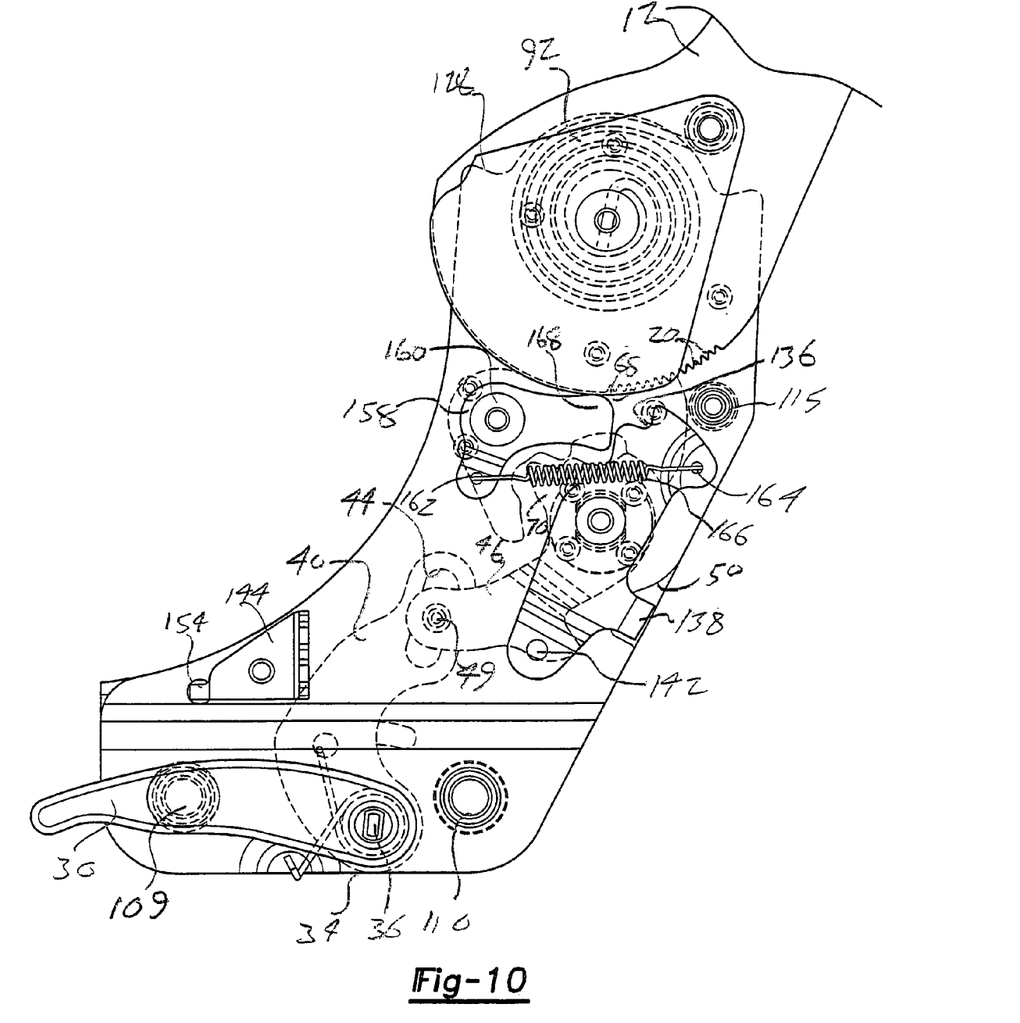
FIG. 10 is a final illustration of a seat back return position, and as substantially previously illustrated in FIG. 4.

The spring tension applied to the cam 158 (see spring 166) further causes the cam 158 to unseat from the recessed configuration 128 of the seat back 12 so that, referring finally to FIG. 10 the seat back is returned to the initial engaged position, as substantially previously illustrated in FIG. 4.

Having described our invention, other and additional preferred embodiments will become apparent to those skilled in the art to which it pertains, and without deviating from the scope of the appended claims.

We claim:

1. A recliner mechanism for use with a vehicle seat, comprising:
   said seat including a seat bottom and a pivotally secured seat back;
   a release mechanism operably engaged to said seat back and including an actuating handle extending from said seat bottom, said release mechanism further comprising a secondary release lever pivotally associated with said handle;
   said seat bottom further comprising an outer plate and an inner plate sandwiching therebetween said seat back and said release mechanism;

a plate secured to said seat back at a first location and pivotable along with said seat back about an axis defined at a second location, an arcuate exterior surface defined by said plate further exhibiting a recessed detent location;

a floor release lever secured to said seat bottom proximate said plate, said floor release lever being pivotally associated with said release mechanism and including a cable extending to a floor latch mechanism associated with the vehicle;

said floor release lever and said secondary release lever each exhibiting an interengaging tab such that said secondary release lever influences said floor release lever in selective first and second directions;

a cam pivotally secured to said seat bottom in interdisposed fashion between said floor release lever and said plate;

said plate, floor release lever and cam being positioned upon an outer facing surface of said inner plate;

wherein, upon said release mechanism rotating said floor release lever and said cable to cause said seat bottom to disengage from said floor latch mechanism, said cam being influenced by said release lever in a first direction to seat against said recessed detent location of said plate and to prevent a forwardly pivoted seat back from being rotated in a reverse direction; and wherein, upon said seat bottom being rotated back into engagement with said floor latch mechanism, said cam being influenced by said release lever in a second direction to permit said seat back to be pivoted in said reverse direction.

2. The recliner mechanism as described in claim 1, said tabs associated with said floor release lever and said secondary release lever extending in interengaging fashion within a recess configured rear surface associated with said inner plate.

3. The recliner mechanism as described in claim 1, said release mechanism further comprising:

a spline rotatably secured in spring-loaded fashion between said inner and outer plates, said handle securing to a projecting end of said spline;

an arcuate shaped lever extending from said rotatable spline, said lever terminating in a remote end within which is defined a slot aperture;

a recliner pawl influenced by a pivotally associated and co-acting cam recliner, said pawl being operatively engaged to said seat back in a first position and disengaged from said seat back in a second position; and said secondary release lever being fixedly secured to said rotatable cam recliner at a first end location, said secondary release lever being slidably secured to said slot aperture in said arcuate shaped lever.

4. The recliner mechanism as described in claim 3, said seat back further comprising a first plurality of serrated teeth extending from a bottom arcuate surface thereof, said recliner pawl comprising a second plurality of teeth which, upon being influenced against said seat back, interengage with selected teeth associated with said first plurality of teeth.

5. The recliner mechanism as described in claim 3, further comprising a main clock spring secured to an exterior facing surface of said outer plate, said main spring influencing a main pivot pin, in turn extending between said inner and outer plates and to which said seat pack is secured, in said forwardly pivoting direction.

6. The recliner mechanism as described in claim 3, further comprising a cam pivot pin to which is pivotally secured said cam recliner, said floor release lever being rotatably secured to an end of said cam pivot pin projecting through said inner plate.

7. The recliner mechanism as described in claim 3, further comprising a rivet to which are pivotally secured said recliner pawl and said cam.

8. A recliner mechanism for use with a vehicle seat, comprising:

said seat including a seat bottom and a pivotally secured seat back;

a release mechanism operably engaged to said seat back and including an actuating handle extending from said seat bottom;

said seat bottom further comprising an outer plate and an inner plate sandwiching therebetween said seat back and said release mechanism, a bracket secured to an exteriorly facing surface of said inner plate;

a plate secured to said seat back at a first location and pivotable along with said seat back about an axis defined at a second location, an arcuate exterior surface defined by said plate further exhibiting a recessed detent location;

a floor release lever secured to said seat bottom proximate said plate, said floor release lever being pivotally associated with said release mechanism and including a cable extending to a floor latch mechanism associated with the vehicle, said bracket supporting said cable extending between said floor release lever and said floor latch mechanism;

a cam pivotally secured to said seat bottom in interdisposed fashion between said floor release lever and said plate;

said plate, floor release lever and cam being positioned upon an outer facing surface of said inner plate;

wherein, upon said release mechanism rotating said floor release lever and said cable to cause said seat bottom to disengage from said floor latch mechanism, said cam being influenced by said release lever in a first direction to seat against said recessed detent location of said plate and to prevent a forwardly pivoted seat back from being rotated in a reverse direction; and wherein, upon said seat bottom being rotated back into engagement with said floor latch mechanism, said cam being influenced by said release lever in a second direction to permit said seat back to be pivoted in said reverse direction.

9. A recliner mechanism for use with a vehicle seat, comprising:

said seat including a seat bottom and a pivotally secured seat back;

a release mechanism operably engaged to said seat back and including an actuating handle extending from said seat bottom;

a plate secured to said seat back at a first location and pivotable along with said seat back about an axis defined at a second location, an arcuate exterior surface defined by said plate further exhibiting a recessed detent location;

a floor release lever secured to said seat bottom proximate said plate, said floor release lever being pivotally associated with said release mechanism and including a cable extending to a floor latch mechanism associated with the vehicle;

a cam pivotally secured to said seat bottom in interdisposed fashion between said floor release lever and said plate;

an extension spring extending between said floor release lever and said cam;

wherein, upon said release mechanism rotating said floor release lever and said cable to cause said seat bottom to disengage from said floor latch mechanism, said cam being influenced by said release lever in a first direction to seat against said recessed detent location of said plate and to prevent a forwardly pivoted seat back from being rotated in a reverse direction; and wherein, upon said seat bottom being rotated back into engagement with said floor latch mechanism, said cam being influenced by said release lever in a second direction to permit said seat back to be pivoted in said reverse direction.

10. A recliner mechanism for use with a vehicle seat, comprising:

said seat including a seat bottom and a pivotally secured seat back;

a release mechanism operably engaged to said seat back and including an actuating handle extending from said seat bottom;

a plate secured to said seat back at a first location and pivotable along with said seat back about an axis defined at a second location, an arcuate exterior surface defined by said plate further exhibiting a recessed detent location;

a floor release lever secured to said seat bottom proximate said plate, said floor release lever being pivotally associated with said release mechanism and including a cable extending to a floor latch mechanism associated with the vehicle;

a cam pivotally secured to said seat bottom in interdisposed fashion between said floor release lever and said plate;

wherein, upon said release mechanism rotating said floor release lever and said cable to cause said seat bottom to disengage from said floor latch mechanism, said floor release lever further comprising a recessed exterior location which abuttingly engages a corresponding projecting edge location of said cam in said seat bottom disengaged position, said cam being influenced by said release lever in a first direction to seat against said recessed detent location of said plate and to prevent a forwardly pivoted seat back from being rotated in a reverse direction; and wherein, upon said seat bottom being rotated back into engagement with said floor latch mechanism, said cam being influenced by said release lever in a second direction to permit said seat back to be pivoted in said reverse direction.

* * * * *